United States Patent

Maumus

Patent Number: 5,154,098
Date of Patent: Oct. 13, 1992

[54] CONNECTING ROD MADE OF COMPOSITE MATERIAL

[75] Inventor: Jean-Pierre Maumus, Cenon, France

[73] Assignee: Societe Europeenne de Propulsion, Suresnes, France

[21] Appl. No.: 608,685

[22] Filed: Nov. 2, 1990

[30] Foreign Application Priority Data

Nov. 13, 1989 [FR] France ................ 89 14862

[51] Int. Cl.$^5$ .............................................. G05G 1/00
[52] U.S. Cl. .................................................. 74/579 E
[58] Field of Search ........................... 74/579 R, 579 E

[56] References Cited

U.S. PATENT DOCUMENTS

| | | | |
|---|---|---|---|
| 4,425,820 | 1/1984 | Swozil | 74/579 E X |
| 4,671,336 | 6/1987 | Anahara et al. | 74/579 E X |
| 4,805,483 | 2/1989 | Beckmann et al. | 74/579 E |
| 4,833,939 | 5/1989 | Beckmann et al. | 74/579 E |
| 4,836,044 | 6/1989 | Löbig | 74/579 E |

FOREIGN PATENT DOCUMENTS

| | | |
|---|---|---|
| 3207573 | 9/1983 | Fed. Rep. of Germany . |
| 3329001 | 12/1984 | Fed. Rep. of Germany .... 74/579 E |
| 3416011 | 5/1985 | Fed. Rep. of Germany .... 74/579 E |
| 2284819 | 4/1976 | France . |
| 0208311 | 12/1982 | Japan ................. 74/579 E |
| 2171489 | 8/1986 | United Kingdom . |

*Primary Examiner*—Rodney H. Bonck
*Assistant Examiner*—Ryan N. Massey
*Attorney, Agent, or Firm*—Weingarten, Schurgin, Gagnebin & Hayes

[57] ABSTRACT

A connecting rod has a central body made of composite material and suitable for taking up traction and compression forces. A composite material little end is fixed to a first end of the central body and connected thereto by a first strap bearing against the little end and against the first end of the central body. A composite material big end comprising an inner half is fixed to the second end of the central body. The big end has an outer half pressed against the inner half by a second strap bearing against the other half and against the second end of the central body and means for pre-stressing the second strap.

8 Claims, 3 Drawing Sheets

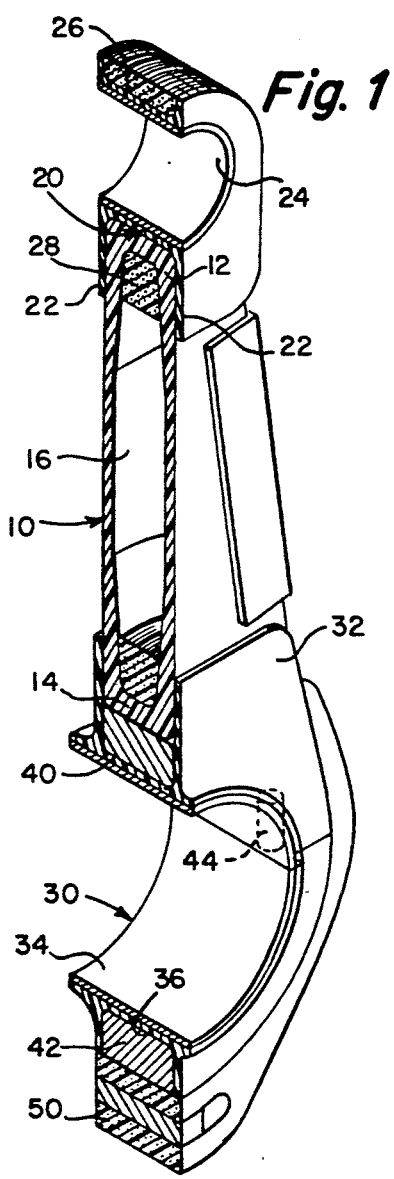
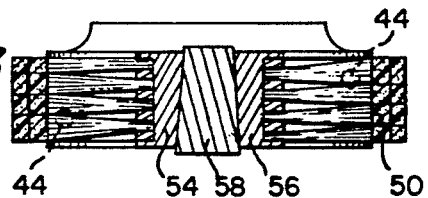
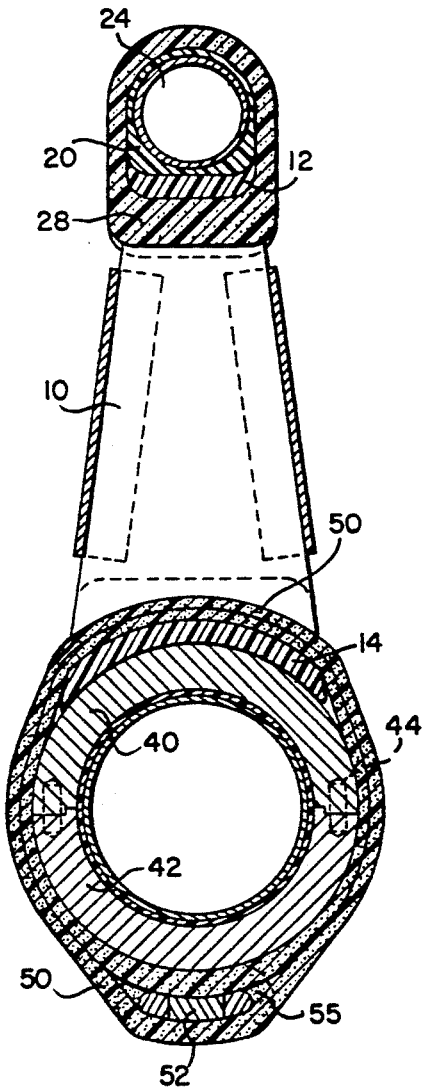
Fig. 1
Fig. 2
Fig. 3

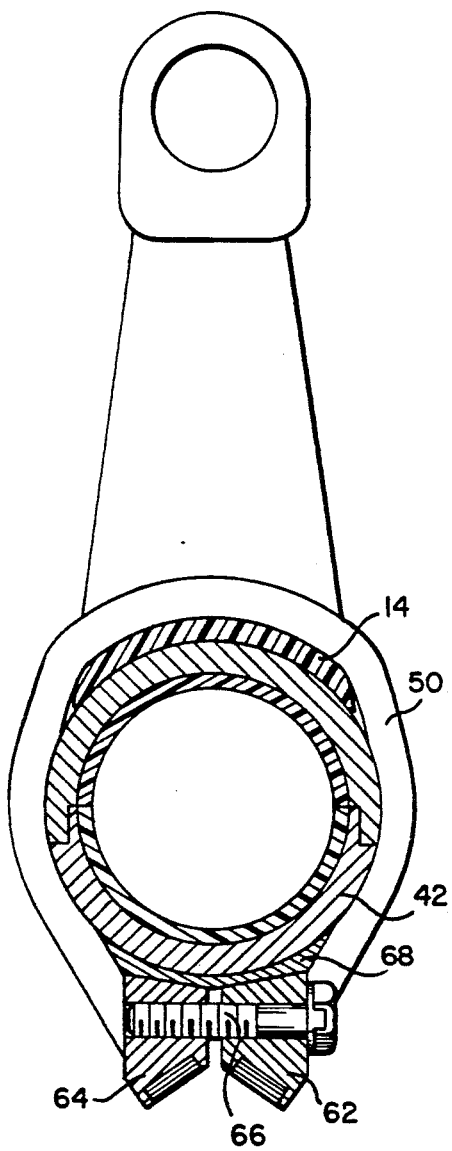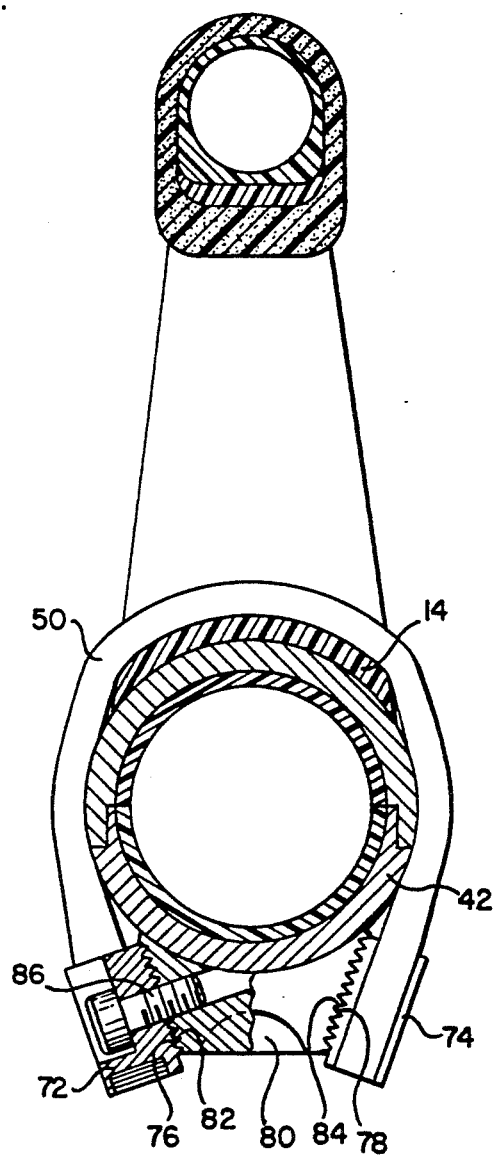

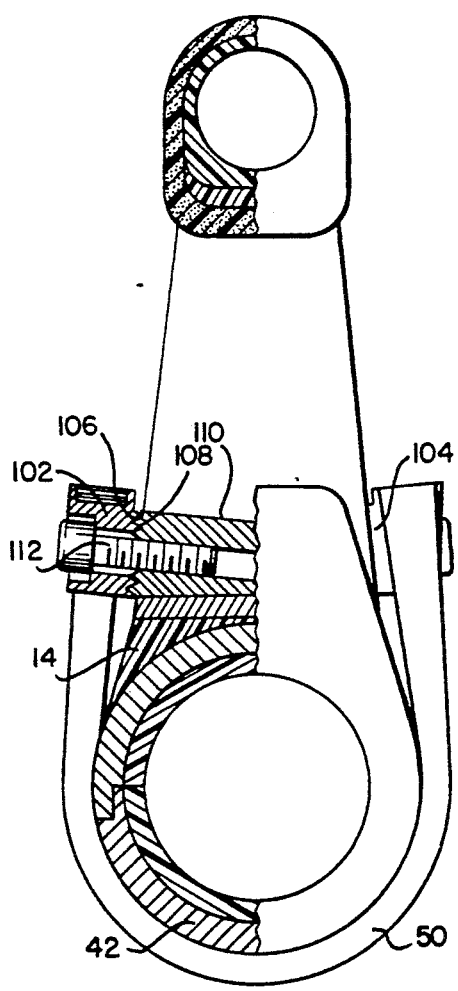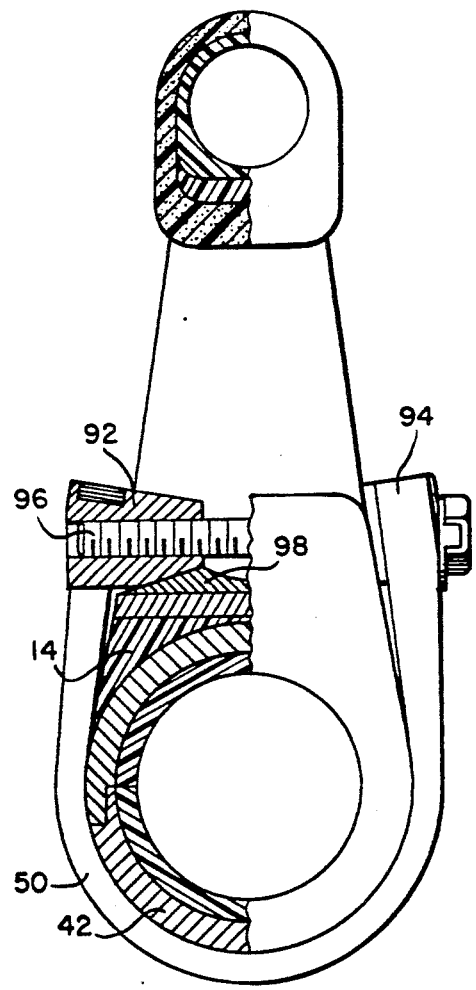

CONNECTING ROD MADE OF COMPOSITE MATERIAL

The present invention relates to a connecting rod made of composite material.

BACKGROUND OF THE INVENTION

More and more numerous applications are being found for composite materials because of the weight savings they provide, because of their mechanical strength, because of their resistance to corrosion, because of their ever-improving high temperature performance, and because of the ease with which they can be implemented. In particular, composite materials have been proposed for, and indeed actually used in, transmission members that in the past have conventionally been made of metal.

Proposals have thus been made to make connecting rods out of composite material, in particular pre-stressed connecting rods whose big and little ends are under constant pre-stress from a winding or strap interconnecting them, with the central body of the connecting rods taking up compression forces.

An object of the present invention is to provide a composite material connecting rod which, while having an architecture which is adapted to the forces to which it is subjected, is nevertheless easy to mount and dismount.

SUMMARY OF THE INVENTION

According to the present invention, this object is achieved by means of a connecting rod comprising:

a central body made of composite material and suitable for taking up traction and compression forces;

a composite material little end fixed to a first end of the central body and connected thereto by a first strap bearing against the little end and against said first end of the central body;

a composite material big end comprising an inner half fixed to the second end of the central body and by an outer half pressed against the inner half of the big end by means of a second strap bearing against the said outer half and against the said second end of the central body; and means for pre-stressing the strap.

Compared with a connecting rod in which the big and little ends are pre-stressed by a winding which connects them to each other, the connecting rod of the present invention presents several advantages.

Thus, the pre-stress of the second strap does not crush either the big end or the little end of the connecting rod. In addition, this pre-stress can be controlled better since the elasticity of the central body is not involved.

Further, problems relating to expansion differences between the central body and the winding interconnecting the big and little ends of the connecting rod no longer arise.

Advantageously, the central body of the connecting rod is hollow having an opening which extends lengthwise along the connecting rod and which opens out on either side of the central body.

The straps connecting the central body respectively to the little end of the connecting rod and to the outer half of the big end of the connecting rod can thus pass through the openings in the central body at respective ends thereof, thus bearing against the insides of the closing end portions of the central body.

The straps may be made, for example, by winding a tape which may itself be made of composite material.

The pre-stress of the second strap connecting the outer half of the big end of the connecting rods to the central body is made by any appropriate means for facilitating assembly and disassembly.

BRIEF DESCRIPTION OF THE DRAWINGS

Embodiments of the invention are described by way of example with reference to the accompanying drawings, in which:

FIG. 1 is a diagrammatic perspective view of a composite material connecting rod of the invention shown in longitudinal section;

FIG. 2 is an elevation view in section of the FIG. 1 connecting rod; FIG. 3 is an view of the big end of the FIG. 1 connecting rod; and FIGS. 4 to 7 are elavation views in section or in half-section showing connecting rods of the invention with different means for pre-stressing the strap connecting the big end of the connecting rod to its central body.

DETAILED DESCRIPTION

The connecting rod shown in FIGS. 1 to 3 comprises a central body 10, a little end 20 connected to one end 12 of the central body by a strap 28, and a big end 30 comprising an inner half 40 fixed directly to the other end 14 of the central body and an outer half 42 fixed to the central body by means of a pre-stress strap 50.

The central body 10 is hollow in shape having an opening 16 which extends lengthwise between its ends 12 and 14 and which opens out on either side of the body 10.

The central body 10 is made of a composite material suitable for withstanding traction and compression forces, for example a material having reinforcement constituted by carbon fibers and densified by means of a resin matrix, e.g. an epoxy resin.

Other composite materials could be used to make the central body, in particular materials in which the reinforcement is constituted by fibers or cloth made of a material selected from glasses or high modulus or high strength carbons, and having a matrix constituted by a material selected from PSP, polyimides, theroplastic resins, etc.

The little end 20 has flanks 22 constituting the faces of the little end through which its central bore 24 opens out, and which together form a groove 26. The portion of the liitle end 20 which is adjacent to the central body 10 fits over the end 12 of the central body with the flanks 22 overlying each of the faces of the central body and with the groove 26 matching the shape of the end 12.

The little end 20 is made of a composite material of the same nature as that used to make the central body 10. The little end 20 is fixed to the central body 10 by gluing, e.g. by means of a glue of the epoxy, PSP, or polyimide type, and the fixing is completed by means of a strap 28.

The strap 28 is constituted by a winding of a high modulus carbon thread impregnated with epoxy resin. The thread is wound round the little end 20, being recieved in the groove 26, and round the end 12 of the central body by passing through the opening 16, with the opening 16 giving the end 12 of the central body a U-shaped section. The strap 28 serves not only to hold the little end 20 onto the central body 10; it also contributes to stiffening the little end 20.

Like the little end 20, the big end 30 has flanks 32 which constitute the faces of the big end and through which the central bore 34 therof opens out, with the flanks leaving a groove 36 therebetween.

In its portion adjacent to the central body 10, the inner half 40 of the big end fits to the end 14 of the central body, with the flanks 32 overlying each of the faces of the central body and with the groove 36 mathing the shape of the end 14.

The outer half 42 is connected to the inner half 40 by using positioning pegs 44 that pass through the connection plane therebetween. the inner half 40 and the outer half 42 are made of a composite material having the same nature as that used for making the central body 10.

The big end 30 is connected to the central body 10 by gluing its inner half 40 to the end 14 of the central body, together with a strap 50.

The strap 50 comprises a winding of a "Kevlar" thread. The thread is wound separately or in situ around the big end, being received in the groove 36 and around the end 14 of the central body by passing through the opening 16 which imparts a U-shaped section to the end 14.

The strap 50 is pre-stressed by means of a pre-stress device 52. This device is constituted by an expandable core disposed at the outermost end of the big end. During winding, the tape constituting the strap 50 passes round the core 52 forming a loop 55. As shown in FIG. 3, the core 52 is constituted by two side pieces 54 and 56 having a wedge-forming central piece 58 disposed inbetween them. The side pieces 54 and 56 have facing faces that constitute sloping ramps which co-operate with the wedge 58 in order to enable the strap to be put under pre-stress by moving the pieces 54 and 56 apart, thereby obtaining controlled expansion of the core 52.

The pre-stressing the strap 50 makes it possible to transmit traction forces to the central body 10 without deforming the big end. Compression forces are also taken up by the central body 10. The connecting rod is easily dismounted by releasing the pr-stress in the strap 50 by removing the wedge 58, and then removing the strap 50. The connecting rod can subsequently be remounted just as easily.

Other embodiments of the pre-stress device for the strap 50 may also be envisaged while retaining the possibility of mounting and dismounting the connecting rod easily.

The connecting rods shown in FIGS. 4 to 7 differ from that shown in FIG. 1 essentially in the way the strap 50 is implemented and in the means for pre-stressing it.

In FIG. 4, the strap 50 is in the form of a clamping collar which is provided with endpieces 62 and 64 that are interconnected by means of a screw 66. A wedge 68 is disposed at the end of the outer half 42. Adjacent to the outer half, the wedge 68 has a face whose shape is complementary to that of the outer half 42. On its opposite side, the wedge 68 has two ramps against which the pieces 62 and 64 bear in order to apply pre-stress to the strap 50 by tightening the screw 66, with the strap 50 bearing directly on the end 14 of the central body 10 by passing through the opening 16.

FIG. 5 also shows a strap 50 which is in the form of a clamping collar provided with endpieces 72 and 74. The endpieces 72 and 74 have faces including teeth 76 and 78 which co-operate with corresponding teeth 82 and 84 formed on two opposite sides of a piece 80. The base of this piece 80 bears against the outer face of the outer half 42, with the face adjacent to the outer half having a shape which is complementary thereto, while the sides provided with teeth 82 and 84 taper towards each other going away from the base of the piece 80. Once the desired pre-stress has been applied to the strap 50 by appropriate relative positioning of the teeth on the endpieces 72 and 74 and the teeth on the piece 80, the strap 52 is locked in place by means of a screw 86 which fastens one of the endpieces 72 and 74 onto the piece 80.

In FIGS. 4 and 5, the strap is shown as bearing directly against the end 14 of the central body 10 by passing through its opening 16, with the ends of the strap being interconnected at the end of the connecting rod by bearing against the outer half of the big end.

Conversely, the strap 50 could be disposed in such a manner as to bear directly against the outer half 42 of the big end with the ends of the strap being interconnected in the vicinity of the end 14 of the central body 10.

Thus, FIG. 6 shows a strap 50 passing around the outer half 42 of the big end and provided with endpieces 92 and 94 which are interconnected by a screw 96 passing through the opening 16. A wedge 98 is disposed inside the opening 16 and bears against the end 14. The face of the wedge 98 which is in contact with the central body is complementary to the shape of the central body at the end 16 thereof, while the opposite face of the wedge 98 has two ramps against which the endpieces 92 and 94 bear. The strap 50 is pre-stressed by tightening the screw 96, thereby causing the pieces 92 and 94 to slide over the ramps on the wedge 98.

Finally, FIG. 7 shows a strap 50 passing around the outer half 42 of the big end and provided with endpieces 102 and 104. These endpieces have teeth 106 which co-operate with corresponding teeth 108 formed at two ends of a piece 110. The piece 110 has a base which bears against the end 14 of the central body, whereas its sides provided with teeth 108 taper towards each other away from the base. When the teeth 106 have been engaged with the teeth 108 to achieve the desired degree of tension in the strap 50, the strap is locked in place by means of at least one screw 112 which fixes one of the endpieces 102, 104 to the piece 110.

I claim:

1. A composite material connecting rod comprising:
   a central body made of composite material and suitable for taking up traction and compression forces, said central body having opposite first and second ends;
   a composite material little end fixed to the first end of the central body and connected thereto by a first strap formed of a winding engaging the little end and said first end of the central body;
   a composite material big end comprising an inner half fixed to the second end of the central body and an outer half pressed against the inner half of the big end by means of a second strap formed of a winding engaging the outer half and said second end of the central body;
   means for pre-stressing the second strap, said means for prestressing ensuring engagement of said inner half and said outer half and substantially avoiding longitudinal compressive stresses along said central body caused by interaction of said means for prestressing and said second strap; and
   wherein said central body is free of inherent stresses caused by said first strap and said second strap urging said little end and said big end toward each other.

2. A connecting rod according to claim 1, wherein the central body is hollow and has an opening which extends lengthwise therealong between its first and second ends, and which opens out into each side of the central body.

3. A connecting rod according to claim 2, wherein the first strap is wound around the first end of the central body by passing through said opening.

4. A connecting rod according to claim 2, wherein the second strap is wound around the second end of the central body by passing through said opening.

5. A connecting rod according to claim 4, wherein the second strap is wound to form a loop around an expandable core designed to impart pre-stress to the second strap.

6. A connecting rod according to claim 1, wherein the second strap is provided with two endpieces which are connected to a tensioning device for imparting pre-stress to the second strap.

7. A connecting rod according to claim 1, wherein the composite material from which the central body, the little end, and the big end are made is a material including reinforcement constituted by fibers selected from carbon fibers and glass fibers, the material being densified by a resin matrix.

8. A connecting rod according to claim 1, wherein the straps connecting the big and little ends to the central body are made by winding a thread.

* * * * *

UNITED STATES PATENT AND TRADEMARK OFFICE
CERTIFICATE OF CORRECTION

PATENT NO. : 5,154,098
DATED : October 13, 1992
INVENTOR(S) : Jean-Pierre Maumus It is certified that error appears in the above-identified patent and that said Letters Patent is hereby corrected as shown below:

Column 3, line 8, "mathing" should read --matching--.

Column 3, line 12, ".the" should read --The--.

Column 3, line 40, "pr-stress" should read --pre-stress-.

Signed and Sealed this

Fifth Day of April, 1994

BRUCE LEHMAN

Attesting Officer

Commissioner of Patents and Trademarks